…

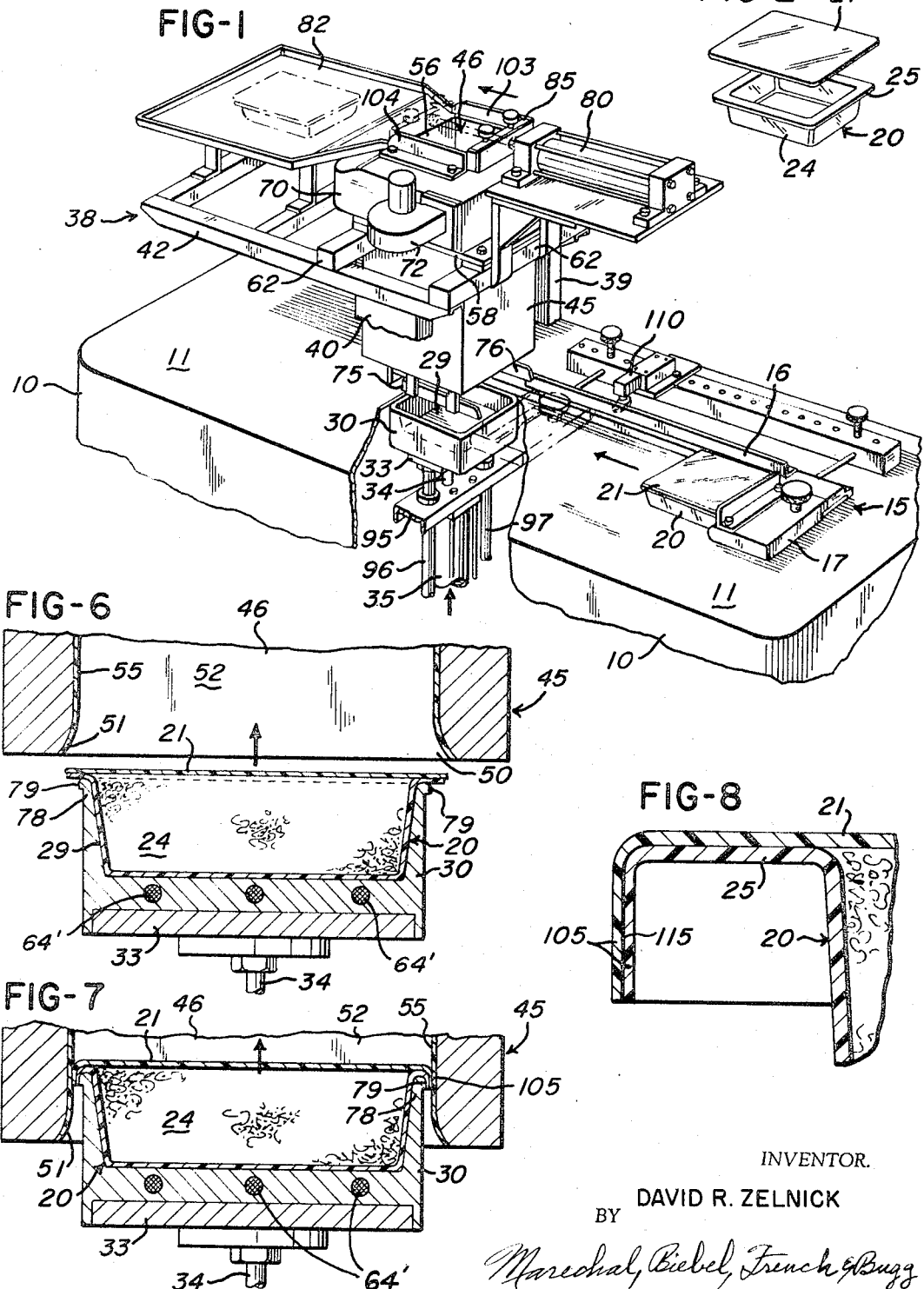

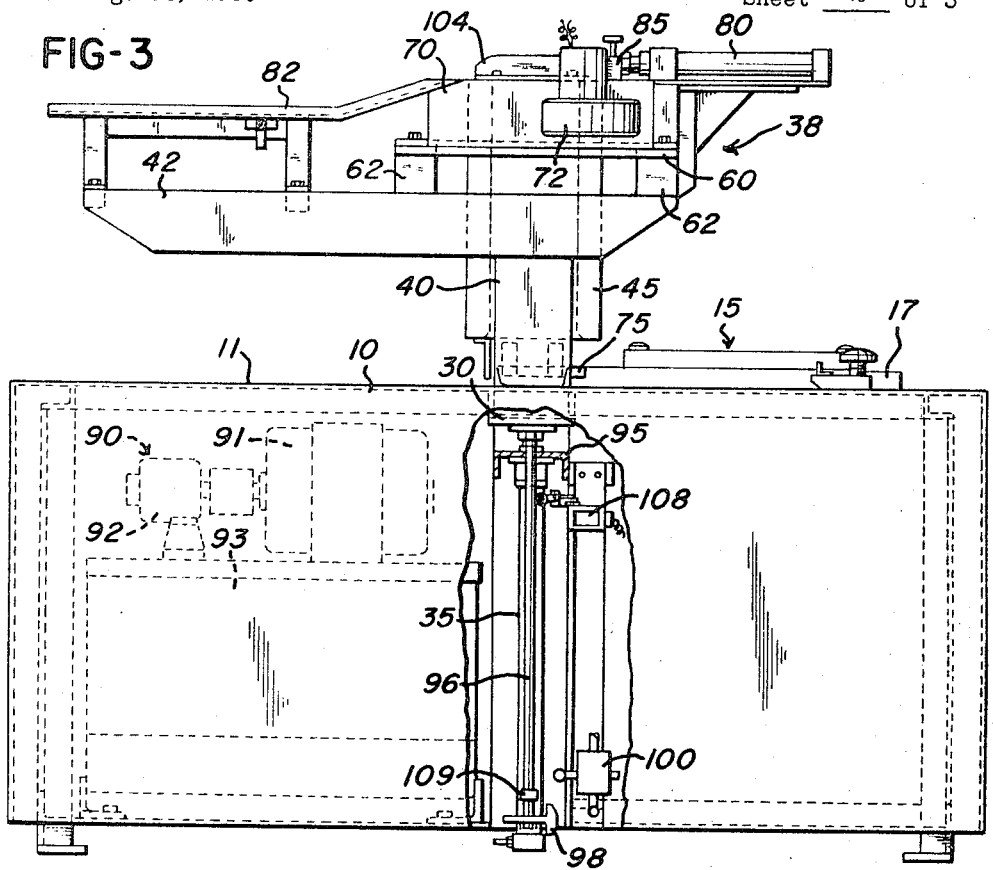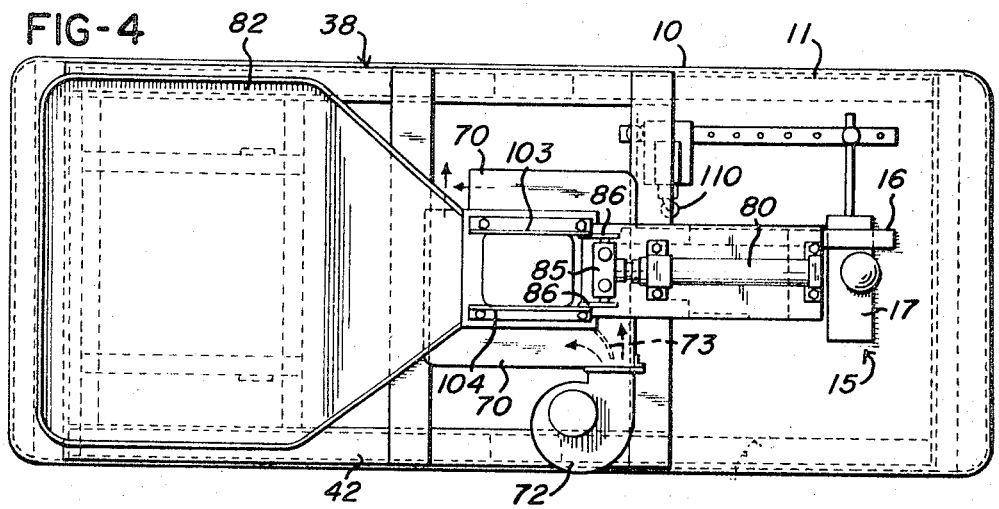

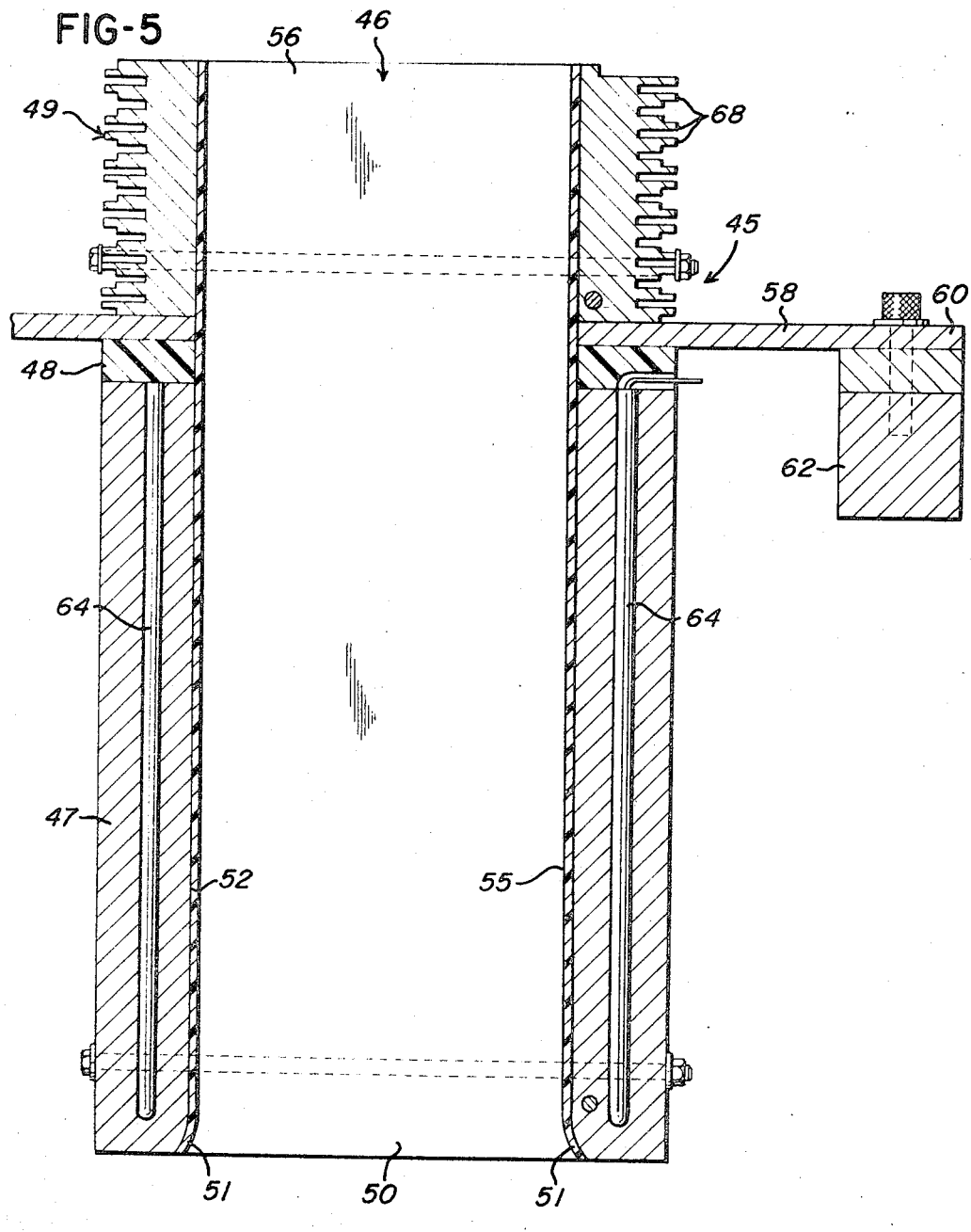

United States Patent Office 3,449,183
Patented June 10, 1969

3,449,183
THERMOPLASTIC SEALING APPARATUS AND METHOD
David R. Zelnick, Dayton, Ohio, assignor to Koehler-Dayton, Inc., Dayton, Ohio, a corporation of Ohio
Filed Aug. 11, 1966, Ser. No. 571,781
Int. Cl. B29d 9/10; B32b 31/04
U.S. Cl. 156—69                               11 Claims This invention relates to the sealing of thermoplastic sheet material and more particularly to a method and apparatus for sealing the lids with containers, such as with food trays and the like.

Food trays and similar containers are frequently formed of plastic sheet material, such as clear oriented polystyrene and other oriented plastics and plastics with high shrink factors. With such material, a particular problem arises with the heat sealing of such containers with a cover formed of the same material, due to the tendency of the material at the seal to revert to its original position, thereby causing an unrelieved strain and a tendency for brittleness at the seal.

It is an important object of this invention to provide a method and apparatus in which the overlapping edges of a lid and container are sealed and fused together and then are cooled, all in one operation, while maintaining the tension and orientation of the material forming the seal while cooling and setting.

Another important object of this invention is the provision of method and apparatus for joining the peripheral overlapping edges of a container and a lid each formed of an oriented thermoplastic material.

More specifically, it is an object of this invention to provide method and apparatus for sealing clear polystyrene lids onto food trays formed of the same material.

The objects and advantages of this invention are accomplished by the provision of a novel method and apparatus in which the peripheral edge of a container and a lid are brought into sliding engagement with a heated surface with a force sufficient to partially deform the peripheral edges and are fused together and in a continuing motion are moved to a cooler surface where they are held a sufficient length of time to maintain orientation of the material while cooling the fused edge. This is accomplished in this invention by the provision of a heat sealing member which is formed with a relatively hot surface and a relatively cooler surface formed generally as a linear continuation of the hot surface, and the articles to be fused are brought in a single motion into sliding contact with the hot surface for a sufficient period of time to effect sealing and are moved along this surface onto the cooler surface and are maintained in relative position while the seal is cooled and set.

These and other objects and advantages of the present invention will be apparent from the following description, the accompanying drawings and the appended claims.

In the drawings:

FIG. 1 is a partially broken away perspective view of apparatus constructed according to this invention;

FIG. 2 is a perspective view of a typical food tray container and lid which are to be sealed together about the peripheral edge in accordance with this invention;

FIG. 3 is a side elevational view, partially broken away, of the apparatus of FIG. 1;

FIG. 4 is a plan view of the apparatus of FIG. 3;

FIG. 5 is an enlarged vertical section through the sealing tube of this invention;

FIGS. 6 and 7 are enlarged diagrammatic views showing the relative positions of the lower end of the sealing tube and the tray supporting pod respectively prior to and following movement of the pod into the tube; and FIG. 8 is an enlarged fragmentary section showing the peripherally sealed lip and top of the container after it has been acted upon by the apparatus of this invention.

Referring to the figures of the drawing which illustrate a preferred embodiment of the invention, apparatus constructed according to this invention is shown in FIG. 1 as including a lower support table 10 having an upper working surface 11. The table 10 includes a tray loading guide assembly 15 having an adjustable tray loading guide 16 and a manually operated tray pusher 17 for moving an assembled tray 20 and lid 21 (FIG. 2) along the surface 11 for sealing by this apparatus.

A typical tray 20 and lid 21 are shown in FIG. 2. The tray 20 may be formed of a clear oriented sheet material, such as, for example, polystyrene, which may be vacuum or pressure-formed, to have an inner food receiving portion 24 and a generally outwardly-extending, peripheral lip 25. The lid 21 may be formed of the same material as the tray 20, and is also rectangular in shape with an outer dimension which slightly exceeds that of the outer dimension of the lip 25. However, it is to be understood that this invention may be used with a wide variety of thermoplastic sheet materials including trays and lids, and the applicability of the apparatus and the method are not limited to the heat sealing of food trays per se, but may be employed to heat seal and cure the overlapping adjacent surfaces of any suitable deformable plastic sheet material.

The tray loader assembly 15 may be operated to place one of the combined trays 20 and lids 21 into the shaped recess 29 formed within a pod 30. The body of the pod 30 is received in a suitable opening formed in the table top 11 with the top of the pod just about even with the table top 11 in the lowered position of the pod. It is to be understood that the tray 20 has been filled with suitable material, such as a foodstuff to be sealed therein. The position of the tray 20 assumes that shown in FIG. 6, with the body 24 of the tray being received within the recess 29 formed within the pod. The pod is, in turn, mounted on a backup plate 33 which is connected to the piston rod 34 of a hydraulic cylinder 35, and the cylinder 35 is received under the table 10.

The apparatus of this invention also includes an upper table portion 38 which is supported above the top 11 on tubular supports 39 and 40. The supports 39 and 40 extend generally vertically at the front and rear edges of the table 10, and are joined with a framework of angle iron forming a platform 42.

The platform 42 supports a sealing tube member 45 in suspended relation immediately over the pod 30. Details of the construction of the member 45 may best be seen by reference to FIG. 5. In this view, the sealing tube member 45 is shown as formed of generally rectangular material defining a vertically-extending opening 46 therethrough. The opening 46 conforms closely to the peripheral shape of the finished container, as described hereinafter.

The member 45 is formed with a lower heated section 47, an intermediate insulating section 48, and an upper cooling section 49. The lower section 47 defines a fluted or curved inlet 50 which is formed with smoothly curving entrance walls 51 leading into the interior opening 46. The interior of the sealing tube member 45 is formed with smooth walls 52 throughout its length, and the walls of each of the respective sections 47, 48 and 49 lie in a generally common plane and form linear continuations of each other. There are four of such walls in accordance with the shape of the package describing a rectangle in section with smoothly rounding corners. The interior walls are preferably given a spray coating 55 of a suitable low friction fluorocarbon such as polytetrafluoroethylene.

The upper cooling section 49 forms an outlet 56, and is separated from the insulating section 48 by means of a generally rectangular mounting plate 58. The plate 58 is formed with a central opening conforming with the interior shape of the opening 46. The mounting plate has oppositely, outwardly-extending supporting ends 60 which rest on cross members 62 forming part of the frame 42. The mounting plate 58 accordingly provides the means for supporting the sealing tube member 45 in vertically aligned relation over the pod 30 so that the pod 30 may move through the rectangular opening 46 upon application of power to the cylinder 35.

Means for maintaining the temperature of the heated section 47 at a temperature to fuse the material forming the lip 25 with the peripheral edge of the cover 21 includes a plurality of rod-type heater elements 64. The heater elements extend vertically in the side walls 52 and are positioned at spaced intervals around the four walls of the member 45, and may be temperature regulated to maintain a suitable sealing temperature at the inside surfaces of the heating section 47. The temperature which is maintained by the heating elements 64 is sufficient to cause softening and fusing of the thermoplastic material, but is not so high to cause burning or degradation of the material. For example, a temperature of approximately 235° has been found suited for use with sealing oriented polystyrene.

As mentioned above, the cooling section 49 is insulated from the heating section 47 by means of an insulating spacer 48. The section 49 is formed with milled fins 68 extending thereabout in the outside surface. A cooling duct 70 (FIG. 4) is formed in generally surrounding relation to the cooling section 49. The duct 70 may be formed of sheet metal and is vertically coterminous with the cooling section 49 and has a forwardly facing mounting plate on which is mounted a blower 72. An internal partial baffle 73 (FIG. 4) divides the air from the bolwer 72 and causes it to circulate either to the right or to the left about the cooling section so that the entire circumference of the cooling section 49 is chilled. It is only necessary to prevent the cooling section from assimilating heat from the heating section 47, so that the portion of the tube walls 52 confined to the cooling section 49 are sufficiently cool to set and maintain the set of the fused edges. Accordingly, the inside surfaces of the cooling section 49 are only relatively cooler than the surfaces of the heating section 47. The sliding onto the cool area allows fast seals because the part is transferred from hot to cool without losing the seal pressure with the tube confining side walls.

A pair of angle shaped guides 75 and 76 are mounted on the bottom of the member 45 at either side of the inlet 50 to guide the assembled tray 20 and lid 21 into position into the recess formed within the pod 30, and to guide the lid 21 during initial pod movement. The pod 30 is formed with a peripheral mandrel 78 which has an outer surface at 79 which forms a close running fit with the coated interior walls 52 of the sealing tube member 45. The clearance space formed between the mandrel 78 and the interior walls of the member 45 is preferably slightly less than the combined thicknesses of the overlapping edges of the lid and the container lip to cause a squeezing and bonding together at these parts. This difference in clearance space, compared to the combined thicknesses of the lid and lip, may be, for example, less than .001 inch up to .005 inch or more, with the smaller differences being used with thinner sheet materials to avoid breaking or tearing at the fused edges.

The pod 30 may also have rod-type heaters 64' inserted therein for the purpose of maintaining a moderate temperature, such as between 130° and 180°, so that the mandrel 78 does not remove any substantial heat from the heated section 47 of the member 45. The application of heat to the pod permits faster and more uniform operation than if no heat were supplied.

The upper table portion 38 also supports an ejection cylinder 80 which is positioned adjacent one side of the outlet 56 of the sealing tube member 45, and a receiving tray 82 positioned adjacent the opposite side. A tray lifting and pushing device 85 (FIG. 4) is positioned on the end of the piston rod of the cylinder 80, and is provided with oppositely spaced parallel fingers 86 which are received under the turned down peripheral edges of the package to lift and push the package onto the receiving tray 82.

The staff table 10 includes a power unit indicated at 90 in FIG. 3 which may consist of a motor 91, a hydraulic pump 92 and a reservoir tank 93. The support table 10 also is formed with a generally channel-shaped cross brace 95 on which the cylinder 35 is dependently mounted. A pair of guide rods 96 and 97 extend downwardly through suitable openings formed in the channel 95, and the rod 96 is provided with a cam 98 thereon adjacent the lower end thereof, as shown in FIG. 3. The cam 98 is proportioned to engage a flow control valve 100 during a portion of the travel of the piston, corresponding to the portion of the travel of the pod 30 through the heated section 47 of the sealing tube member 45. The valve 100 provides means for modulating the rate of travel of the mandrel 78 through the sealing tube, and permits the piston motor 35 to move rapidly into the throat 51 of the member 45, and then slowly while sealing is taking place, and thereafter rapidly through the cooling portion 49 to eject the sealed package out of the top of the member 45. The package is ejected between a pair of channel-shaped guides 103 and 104 positioned at each of the opposite sides of the outlet 55. The stroke of the piston motor is sufficient to cause the package to be fully ejected, and the turned down peripherally sealed rim portions 105 (FIG. 8) spring slightly outwardly and rest on the upper surfaces of the angle iron guides 103 and 104, for removal by the fingers 86.

A limit switch 108 (FIG. 3) engages a collar 109 formed on the rod 96 and signals that the package sealing motion has been completed, thus permitting the cylinder 35 to lower, and at the same time, operates the ejecting cylinder 80 to eject the package onto the receiving tray 82.

A further limit switch 110 (FIG. 4) is operated with each return of the tray loading assembly 15, signaling that a new tray 20 and lid 21 combination has been placed within the hollow 29 of the pod 30, and with the retraction of the tray pusher 17, initiates another operation of the cylinder 35.

The operation of the invention is largely self-evident from the foregoing description. It will be seen that a loaded food tray 20 may be positioned on the upper surface 11 of the table 10 and moved into position within the hollow of the pod 30 by the operation of the loader assembly 15. When this assembly is retracted, it operates the switch 110 and causes the initiation of the operation of the hydraulic cylinder 35. This condition is shown in FIG. 6 as the pod 30 moves upwardly carrying the tray 20 and lid 21 toward the inlet opening 50 of the member 45. The peripheral lip 25 and the corresponding edge of the lid 20 extend outwardly of the manual 78, and are beat downwardly by the curved inlet walls 51 into sliding frictional engagement with the polymer coated walls 52 on the sealing tube, substantially as shown in FIG. 7.

Approximately at this point, the cam 98 comes into contact with the operator of the flow control valve 100 and decreases the rate of movement of the pod 30. As soon as the cam 98 has passed the switch 100, this rate of movement increases. The rate and time within the heated section 47 of the member 45 is sufficient to cause a fusing and bonding together of the peripheral portions along the joining surface 115, FIG. 8. The bonding is enhanced by the frictional engagement with the walls of the turned-down peripheral rim 105 of the package as it moves upwardly through the heating tube.

The pod 30 continues to move upwardly through the member 45 in a continuous movement into and through the cooling section 49 while maintaining the thermoplastic material in its deformed fused condition. After the peripheral rim has been sufficiently cooled permanently to set and reorient the thermoplastic material, the finished and sealed package is ejected through the top 56 of the tube element 45.

At this point, the collar 109 in the rod 96 engages the upper limit switch 108, causing the traction of the pod 30 and the operation of the ejector cylinder 80, to push the package onto the tray, as previously noted. During the operation of the invention, the blower 72 is continuously operating, maintaining the upper cooling section 49 of the tube member 45 in a relatively chilled or cooled condition as compared to the lower section 47.

It will therefore be seen that this invention provides a method of forming a seal between the peripheral lip of a food tray or the like formed of thermoplastic material and a lid formed of the same material. It includes the steps of supporting the thermoplastic material at the peripheral edges while forcing the same into engagement with a heated surface with a lid superimposed while sliding the edge or lip relatively to the surface and while confining contact substantially at the lid and lip, thereby inducing both direct and frictional heating into the lip. The method further includes the continuation of the relatively sliding contact of the peripheral lip of the container off of the heated surface and onto a relatively cooler surface while maintaining substantially the force which was applied at the heating surface, to effect the cooling and the setting of the peripherally fused edge in the deformed and sealed condition. An air tight seal is thus formed insuring against spoilage of the contents within the tray 20, and the tray 20 may be handled without fear of spillage or subsequent contamination.

The apparatus of this invention is both simple in construction and easy to operate. An additional tray 20 may be fed into the pod 30 as soon as it has completed its first cycle of operation, and has returned to the rest position in underlying relation to the bottom of the sealing tube element 45. The arrangement of the parts is such that the lid is drawn over the outside of the mandrel 78, into the slightly more confined spill between the mandrel and the walls, thereby forming and maintaining a sanitary lip and seal within the container. The drawing of the lid, the sealing, and the subsequent cooling, are done in one operation, while maintaining the tension and orientation in the thermoplastic material. It is also within the scope of this invention to use lids and trays which are preformed with turned edges and mating lips.

While the method herein described, and the form of apparatus for carrying this method into effect, constitute preferred embodiments of the invention, it is to be understood that the invention is not limited to this precise method and form of apparatus, and that changes may be made in either without departing from the scope of the invention which is defined in the appended claims.

What is claimed is:

1. Apparatus for joining adjacent overlapping surfaces of a heat deformable plastic sheet material comprising means for positioning said overlapping surface into a desired sealing configuration, means defining a heated surface having a temperature sufficient to fuse said overlapping edges, means for effecting relatively sliding movement of said positioned and overlapped surfaces along said heated surface to effect said fusing thereof, means defining a relatively cooler surface formed as a continuation of said heated surface, and means for continuing said sliding movement onto said cooler surface for setting said overlapping edges in said fused condition.

2. The apparatus of claim 1 in which said heated and cooler surfaces are generally smooth with one being positioned as a linear continuation of the other, and said sliding means comprising a mandrel positioned for movement generally parallel to and adjacent to said surfaces and defining with said surfaces a clearance space sufficient to receive said overlapping edges of said material between said mandrel and said surface under pressure.

3. The apparatus of claim 2 further comprising means for moving said sliding means at a varying rate with respect to said surfaces.

4. The apparatus of claim 3 in which said moving means comprises a cylinder motor, a rod movable by said motor, and a flow control valve operable by said rod to decrease the rate of movement of said cylinder during at least a portion of the travel of said mandrel adjacent said heated surface.

5. Apparatus for sealing thermoplastic lids onto trays of the same material about common peripheral overlapping edges thereof, comprising a tray support adapted to receive such tray and having a peripheral portion defining a mandel over which said common edges may be formed, a hollow elongated sealing member having an opening conforming generally to said mandrel with an inside dimension which is greater than that of the outside dimension of said mandrel sufficient to receive said overlapping peripheral edges therebetween, said member having a first relatively heated portion adapted to maintain a temperature sufficient to fuse said plastic material and a second portion configured generally as a linear continuation of said first portion of substantially lower temperature than said first portion to effect cooling and setting of said plastic material, and means for moving said tray support through said sealing member with a tray and lid positioned thereon in a single movement through each of said member portions at a rate sufficient to fuse said peripheral edges by said first portion and to set and maintain the set of the fused edges by said second portion.

6. The apparatus of claim 5 further comprising means thermally insulating said portions of said sealing member from each other, and blower means for cooling said second portion.

7. The apparatus of claim 5 further comprising a coating of polytetrafluoroethylene formed on the inside surfaces of said sealing member.

8. The apparatus of claim 5 in which said mandrel is partially hollow to receive said tray therein with the peripheral edge thereof extending in overlying relationship to said mandrel, and in which said heat sealing member is formed with a fluted inlet to effect deforming of said tray edge and said lid over said mandrel and into the space between said mandrel and said heated surface.

9. Apparatus of claim 8 in which said moving means comprises a piston motor connected to move said tray support in a single movement from said inlet completely through said sealing member, and means for removing said sealed tray and lid at the outlet of said member.

10. The method of forming a seal between the peripheral lip of a food tray formed of thermoplastic oriented sheet material and a lid formed of similar material comprising the steps of supporting said tray at the lip, superimposing said lid with a portion of the lid overlying said lip, forcing said superimposed lid at said lip into engagement with a heated surface while sliding relative to said surface confining contact of said lid with said surface substantially at said lip and inducing direct and frictional heating into said lip for joining said tray and said top at said lip, and continuing the sliding movement of said tray onto a relatively cooler surface while maintaining the relative position of said tray and said surface to set the thermoplastic material in the sealed condition.

11. The method of joining the peripheral overlapping edges of a container and a lid each formed of a heated thermoplastic oriented material comprising the steps of bringing said container and a lid at said peripheral edges into frictional sliding engagement with a heated surface while confining contact with said surface substantially at said edges and with a force sufficient at least partially to deform the peripheral edges of said container and lid, and while maintaining the temperature of said heated surface sufficient to fuse said lid and container at said edges, and relatively sliding said container and lid off of said heated surface and onto a relatively cooler surface while maintaining substantially said force to effect the cooling and setting of the peripherally fused edge in said deformed condition.

References Cited

UNITED STATES PATENTS

| | | | |
|---|---|---|---|
| 2,402,943 | 7/1946 | Bogoslowsky | 156—69 X |
| 2,413,449 | 12/1946 | Hatch | 156—69 X |
| 2,796,914 | 6/1957 | Park | 156—311 X |
| 3,060,652 | 10/1962 | Eckman | 53—39 X |
| 3,180,778 | 4/1965 | Rinderspacher et al. | 156—311 |
| 3,316,135 | 4/1967 | Brown et al. | 156—73 X |
| 3,367,261 | 2/1968 | Kashiwagi | 156—498 X |
| 3,385,741 | 5/1968 | Allen | 156—306 X |

HAROLD ANSHER, *Primary Examiner.*

U.S. Cl. X.R.

53—15, 39, 46, 373, 379; 156—73, 215, 306, 311, 479, 485, 498, 583